United States Patent Office 3,597,408
Patented Aug. 3, 1971

3,597,408
CONTINUOUS CHLORINATION OF POLYETHYLENE
Hans-Georg Trieschmann, Hambach, Gerhard Zeitler, Hessheim, Pfalz, Lothar Reuter and Heiner Dickhaeuser, Ludwigshafen (Rhine), and Helmut Pfannmueller, Limbergerhof, Pfalz Germany, assignors to Badische Anilin- & Soda-Fabrik Aktiengesellschaft, Ludwigshafen (Rhine), Germany
No Drawing. Filed Aug. 26, 1968, Ser. No. 755,396
Claims priority, application Germany, Aug. 29, 1967,
P 17 20 296.9
Int. Cl. C08f 27/03
U.S. Cl. 260—94.9                                7 Claims

ABSTRACT OF THE DISCLOSURE

A continuous process for the chlorination of relatively coarse particled high pressure polyethylene as a suspension of 2–6 mm. particles in a liquid chlorohydrocarbon with withdrawal of the chlorinated polyethylene as a solution in the chlorohydrocarbon.

---

This invention relates to a continuous process for the chlorination of polyethylene in which finely particled polyethylene is suspended in chlorohydrocarbons and treated with chlorine.

Methods of chlorinating polyethylene are known in which finely particled polyethylene in chlorohydrocarbons is treated with chlorine. The polyethylene used is in the form of particles having a diameter of from 20 to 300 microns. It is found that when operating the prior art method continuously for the chlorination of high pressure polyethylene, difficulties are encountered. Thus, for example, finely powdered ethylene polymers agglomerate in the reaction mixture so that disturbances occur in the course of operations.

The object of the invention is to provide a continuous process for the chlorination of polyethylene in which no agglomeration of the solid constituents takes place. Another object of the invention is to prepare in this way a product which has a uniform degree of chlorination.

These objects are achieved in accordance with this invention by a process in which polyethylene having a density of from 0.910 to 0.935 is introduced in the form of particles having a diameter of from 2 to 6 mm. together with a chlorohydrocarbon and chlorine into a reaction zone which contains polyethylene and chlorohydrocarbon containing 1 to 20% of chlorinated polyethylene in dissolved form a portion of the liquid phase is continuously withdrawn from the reaction zone, the amount of which is equivalent to the amount continuously introduced, and chlorinated polyethylene is isolated from the liquid phase.

The process is suitable for chlorinating high pressure polyethylene whose density is within the range from 0.910 to 0.935 and whose molecular weight lies within the range from 10,000 to 180,000. The polymer should be in the form of compact particles whose diameter is from 2 to 6 mm., preferably from 4 to 5 mm.

Chlorination is carried out in low boiling point chlorohydrocarbons whose boiling point is advantageously in the range from 30° to 90° C. For example carbon tetrachloride, chloroform and trichloroethane are suitable. Chlorination is carried out at temperatures of from 50° to 150° C., advantageously from 60° to 80° C. Sometimes it is advantageous to carry out the chlorination under the action of ultraviolet light or high energy radiation or in the presence of chorination catalysts, such as peroxides.

The reaction zone may contain 4 to 20 parts by weight of the chlorohydrocarbon with reference to 1 part by weight of polyethylene. 1 to 20%, preferably 5 to 10%, by weight of already chlorinated polyethylene is present in dissolved form in the chlorohydrocarbon. A fraction of the liquid phase is continuously withdrawn from the reaction zone, this fraction being equivalent to the amount of polyethylene, chlorohydrocarbon and chlorine continuously supplied to the reaction zone. Discharge may take place by sucking off the liquid phase through a filter or by centrifuging it. It is advantageous to withdraw from about the whole to one-fourth part of the reaction mixture per hour.

According to a preferred embodiment of the process the amount of chlorine to be introduced per hour is controlled so that the amount of chlorinated polyethylene passing into solution per hour corresponds to the desired chlorine content of the polymer. In order to dissolve for example 100 parts of polyethylene in chlorinated form per hour in the liquid phase of the reaction mixture it is necessary to introduce 40 parts of chlorine per hour into the reaction mixture to achieve a degree of chlorination of 15% of chlorine in the polymer.

The process according to the invention has the advantage that no agglomeration of the solid constituents of the reaction mixture takes place. According to a preferred embodiment of the process chlorinated polyethylene can be obtained which contains from 5 to 75% by weight of chlorine. In accordance with prior art batch methods it is not possible in a simple way to produce chlorination products having chlorine fractions in the whole of the abovementioned range. In the processes according to the prior art the chlorinated constituents which have already passed into a solution are preferentially chlorinated so that up to the point at which complete dissolution of the reaction material has taken place, the reaction mixture contains chlorinated polymers having greatly differing degrees of chlorination.

The invention is illustrated by the following examples in which parts and percentages are by weight.

EXAMPLE 1

100 parts of high pressure of polyethylene having a density $\rho = 0.918$ in granulate form (which has been prepared by a conventional method, which has a molecular weight of 100,000, which has a degree of branching of thirty-six $CH_3$ groups per 1,000 carbon atoms) in the form of cylindrical granulate particles having a diameter of 2 mm. and a length of 4 mm. together with 1,400 parts of carbon tetrachloride are continuously introduced per hour into a stirred vessel fitted with a reflux condenser, a gas inlet pipe and means for supplying and withdrawing liquid substances and granulated solid substances. The stirred vessel is filled to two-thirds of its capacity with reaction medium. The reaction medium contains 6.5% of chlorinated polyethylene dissolved in it. 56 parts of gaseous chlorine is passed in atmospheric pressure at a temperature of 77° C., and the chlorinated polyethylene present in solution is continuously withdrawn as a solution at a rate of about 1,500 parts per hour. After the solvent has been removed by precipitation with methanol, a chlorinated high pressure polyethylene having a chlorine content of 24% is obtained at a residence time of one hour. The product is suitable for film, sheeting, cable sheathing and for coating textiles.

When the above procedure is followed but with a polyethylene in powder form having a particle diameter of from 100 to 600 microns, agglomerates form in the reaction chamber which makes continuous operation impossible.

EXAMPLE 2

The procedure described in Example 1 is adopted but with 84 parts per hour of gaseous chlorine at a residence time of two hours. A chlorinated polyethylene is obtained which has a chlorine content of 64%. The reaction medium contains 13.7% of chlorinated polyethylene in dissolved form. The product is suitable as a plastic and (together with plasticisers such as are conventionally used with polyvinyl chloride) as a binder for surface coatings.

We claim:

1. A continuous process for chlorinating polyethylene in which finely particled polyethylene is treated in low boiling point chlorohydrocarbons with chlorine which comprises continuously introducing into a reaction zone a high pressure polyethylene in the form of particles having a diameter of from 2 to 6 mm., a liquid chlorohydrocarbon and gaseous chlorine at substantially atmospheric pressure, maintaining in said reaction zone a suspension of said particles in said chlorohydrocarbon at a temperature of 50 to 150° C., dissolving in said chlorohydrocarbon 1–20 percent by weight of chlorinated high pressure polyethylene obtained by chlorination with said gaseous chlorine of said high pressure polyethylene particles, continuously withdrawing from the reaction zone a fraction of the liquid phase which is equivalent in amount to the amount of reactants being continuously introduced, and isolating chlorinated polyethylene from the liquid phase withdrawn.

2. A process as claimed in claim 1 in which the high pressure polyethylene to be chlorinated has a density of from 0.910 to 0.935 and a molecular weight of from 10,000 to 180,000.

3. A process as claimed in claim 1 wherein the liquid phase in the reaction zone contains 5 to 10% by weight of chlorinated polyethylene in dissolved form during the chlorination.

4. A process as claimed in claim 1 wherein carbon tetrachloride is used as the chlorohydrocarbon.

5. A process as claimed in claim 1 wherein the polyethylene used has a particle size of from 4 to 5 mm.

6. A process as claimed in claim 1 wherein chlorination is carried out at from 60° to 80° C.

7. A process as claimed in claim 1 wherein said reaction zone contains 4 to 20 parts by weight of said chlorohydrocarbon per part by weight of said high pressure polyethylene.

References Cited

UNITED STATES PATENTS

| | | | |
|---|---|---|---|
| 2,398,803 | 4/1946 | Myles et al. | 260—94.9 |
| 2,964,509 | 12/1960 | Hurt | 260—88.2 |
| 3,035,038 | 5/1962 | Nolte et al. | 260—94.9 |
| 3,454,544 | 7/1969 | Young et al. | 260—88.2 |

JAMES A. SEIDLECK, Primary Examiner

R. A. GAITHER, Assistant Examiner